United States Patent [19]
Pfordt

[11] Patent Number: 5,518,461
[45] Date of Patent: May 21, 1996

[54] DUAL HYDRAULIC MOTOR DRIVE SYSTEM

[75] Inventor: Hartwig Pfordt, Witten, Germany

[73] Assignee: Mannesmann Aktiengesellschaft, Dusseldorf, Germany

[21] Appl. No.: 436,603

[22] Filed: May 8, 1995

Related U.S. Application Data

[63] Continuation of Ser. No. 206,540, Mar. 4, 1994.

[30] Foreign Application Priority Data

Mar. 8, 1993 [DE] Germany ............ 43 07 616.5

[51] Int. Cl.$^6$ .................................. F16H 47/04
[52] U.S. Cl. ............................. 475/72; 475/73
[58] Field of Search .................... 475/72 OR, 75, 475/73, 80, 83, 2; 74/661; 180/53.4

[56] References Cited

U.S. PATENT DOCUMENTS

| | | | |
|---|---|---|---|
| 4,313,351 | 2/1982 | Hagin | 475/80 |
| 4,778,020 | 10/1988 | Hagin et al. | 180/53.4 |
| 4,930,590 | 6/1990 | Love et al. | |
| 4,939,949 | 7/1990 | Langenberg | 475/2 |
| 5,071,391 | 12/1991 | Kita | 475/80 |
| 5,137,100 | 8/1992 | Scott et al. | 180/53.4 |
| 5,193,416 | 3/1993 | Kanayama | 475/80 X |

FOREIGN PATENT DOCUMENTS

| | | |
|---|---|---|
| 1555247 | 10/1970 | Germany. |
| 3137857 | 4/1983 | Germany. |
| 3907633 | 9/1990 | Germany. |
| 296997 | 12/1991 | Germany. |

*Primary Examiner*—Charles A. Marmor
*Assistant Examiner*—Peter Kwon
*Attorney, Agent, or Firm*—Cohen, Pontani, Lieberman, Pavane

[57] ABSTRACT

A drive system includes two reversible hydraulic motors connected in parallel to a variable displacement pump and controlled by respective 4-port, 2-position valves. The motors, at least one of which is a variable flow, variable speed motor, are coupled to a single output shaft via an intermediate gear section. The hydraulic motors are positioned on one side of the intermediate gear section and their respective drive shafts are arranged parallel relative to one another. A clutch, which is concentrically disposed within an axial bore of a gear member, is operable to couple the drive shaft of a first of the motors to the output shaft. A second gear member, which is driven by the output shaft of a second of the motors, is adapted to mesh with the first gear member. If both motors are of variable speed construction, it is possible to operate the drive in three speed ranges, i.e. by operation of the first hydraulic motor only, by operation of the second hydraulic motor only, or by simultaneous operation of both hydraulic motors.

8 Claims, 1 Drawing Sheet

DUAL HYDRAULIC MOTOR DRIVE SYSTEM

This is a continuation of application Ser. No. 08/206,540, filed Mar. 4, 1994.

BACKGROUND OF THE INVENTION

1. Field of the Invention

This invention relates generally to hydraulic drives and, more particularly, to a continuously adjustable multiple range hydraulic drive.

2. Description of the Prior Art

Utility vehicles for agriculture, forestry or construction, as well as winches and cranes, are often driven by a hydraulic motor via a speed reduction gear or a step-down gear unit. For example, described in German Published Specification DE-OS 3137857 is a single-wheel drive unit in which a planetary gear unit driven by a hydraulic motor is arranged in a cup-shaped outer housing forming the hub of a vehicle. Drives of this configuration, however, achieve only relatively low transmission ratios when utilizing a variable displacement pump. This limitation is therefore particularly disadvantageous in situations where the utility vehicle must travel on public roadways, such as during movement between construction sites, because of the need to travel at the highest possible speed and thereby avoid causing traffic congestion.

In German Patent DE 39 07 633 A1, there is described a static displacement or hydrostatic drive having two hydraulic motors driven in parallel by a variable displacement pump. The hydraulic motors described therein, at least one of which is constructed so as to be shiftable, drive a single output shaft via an intermediate gear system. The output shaft drives the axle of a vehicle. A clutch, provided between the adjusting motor and the output, can be installed either between the intermediate gear and the output or between the adjusting motor and the intermediate gear.

With reference to the output, the gear ratio of the shiftable intermediate gear and that of the non-shiftable intermediate gear are selected differently in the prior art configurations mentioned above. While the transmission ratio of the non-shiftable intermediate gear of the present invention is roughly the same as that found in a conventional fixed displacement motor, it is considered essential to the present invention that the shiftable intermediate gear connected to the variable speed motor have a greater gear ratio. Known hydraulic motors are provided with fixed absorbing capacity and a gear reduction of the output shaft corresponding thereto. Moreover, in the known hydrostatic drives discussed above, the hydraulic motors themselves are arranged at both sides of the intermediate gear section. As such, a further disadvantage is present in that the intermediate gear and the axle drive require separate housings.

According to the process known from the prior art mentioned above, a rapid transition of the variable valve element of the variable speed hydraulic motor to the angle $\alpha=0$ simultaneously results in a corresponding reduction of the swing-out angle of the drive pump. A large capital expenditure on control technology is required for the accurate coordination of these individual process steps.

A drive in which a pump drives a plurality of parallel hydraulic motors which are connected in turn individually with an intermediate gear is shown and described in U.S. Pat. No. 3,421,389. Each motor can be disconnected from the intermediate gear by a clutch and braked by brakes, In that patent, it is indicated that the individual stages may also be disconnected hydraulically, that is, by means of valves, instead of using the mechanical clutch and brakes. Neither the use of adjusting pumps, nor of adjusting motors, however, is known from this bulkily constructed drive. Moreover, the expensively outfitted drive requires a brake for braking the hydraulic motor precisely when the drive shaft of the respective motor is decoupled from the intermediate gear.

Accordingly, in hydraulic valve applications of the prior art, there has been no suggestion relating to means for preventing a speeding up of a hydraulically decoupled motor.

It is therefore an object of the present invention to provide a continuously adjustable multiple-range hydraulic drive which is simple and compact in construction, which utilizes a minimum of structural components, and which achieves a high conversion ratio while avoiding the disadvantages mentioned above.

SUMMARY OF THE INVENTION

The aforementioned objectives, as well as others which will become apparent to those skilled in the art, is achieved by a drive comprising two hydraulic motors which are connected in parallel to a variable displacement pump and which act on an output shaft via an intermediate gear section. At least one of the hydraulic motors is constructed as a variable speed motor.

The compact drive of the present invention comprises the following subassemblies: a hydraulic system, an intermediate gear section and a power take-off section. The hydraulic motors of the hydraulic drive are positioned on one side of the intermediate gear section and their respective drive shafts are arranged parallel relative to one another. A first hydraulic motor, which is preferably configured as a variable displacement motor for adjustable speed operation, is connected to a central shaft which has a direct connection with a driving member arranged on the opposite side of the intermediate gear housing. The driving member may be constructed as a tumbler, wheel or winch.

The central shaft is coupled, at its proximal end, to the drive shaft of the first hydraulic motor by a coupling or clutch. The distal end of the central shaft is coupled to the driven member. The clutch is disposed within the central bore of a first spur gear which meshes with a second spur gear driven by a second hydraulic motor.

The drive of the present invention is simple to construct and utilizes a minimum of basic structural components. Advantageously, the present invention makes it possible to disconnect the hydraulic driving assembly, including its control unit, from the mechanical driven assembly. By employing a planetary gear unit in the driven assembly, the end stud is advantageously supported in the housing of the intermediate gear. This configuration results in a drive which is reliable, resistant to wear, and easy to service.

When the first hydraulic motor is configured as a null-stroke motor, it is possible to drive the driven member solely by the second hydraulic motor. The second hydraulic motor can also be configured as a variable displacement motor so that the drive can be effected in this combination via one of the two hydraulic motors of the drive without additional mechanical disconnecting members aside from the clutch, which clutch is already present.

Elements which shut off the power supply to the respective hydraulic motor not in operation are provided in the hydraulic circuit. 4-port/2-position valves or control devices for the variable displacement motors, which motors are constructed as null-stroke motors, are used. The hydraulic motor which is not in use is simply and reliably shut off by these elements without causing damage, i.e. without the risk of the motor continuing to turn without a load and exceeding the maximum allowable speed. As a result of this use of pre-charged control elements, it is possible to operate the drive in three speed ranges (i.e., by operation of the first hydraulic motor only, by operation of the second hydraulic motor only, or by simultaneous operation of both hydraulic motors).

In this manner, a longstanding demand of the industry is met, that is, to drive utility vehicles in at least two distinctly different speed ranges. A road finishing machine which should be moved within the shortest possible time from one work site to another may be cited as one example of a vehicle in which the drive of the present invention may be advantageously utilized. Moreover, industrial trucks or cranes outfitted with drives constructed in accordance with the present invention can be driven through the entire operating range, with a broad transmission ratio and in a continuously variable manner, so as to travel quickly between work sites, or in a high torque operation during the working phase without damaging the mechanical and hydraulic structural components thereof. It should be noted that no special cooling equipment is required during operation of the present invention because the ability to operate at an optimum transmission ratio avoids the high level of heat generation associated with high speed operation of conventional drives.

The planetary gear unit can be constructed in one or more stages. A brake, which is preferably mechanical, is provided at the output shaft and used for mechanically locking the drive. The brake is also utilized when defects occur in the hydraulic part of the drive. This is particularly important when the drive according to the invention is used in winches.

BRIEF DESCRIPTION OF THE DRAWINGS

The nature of the invention will be more clearly understood by reference to the following description, the appended claims, and the accompanying Figure.

Figure depicts a schematic representation of a multiple speed range hydraulic drive in accordance with the present invention.

DETAILED DESCRIPTION OF THE PREFERRED EMBODIMENTS

Figure 1:
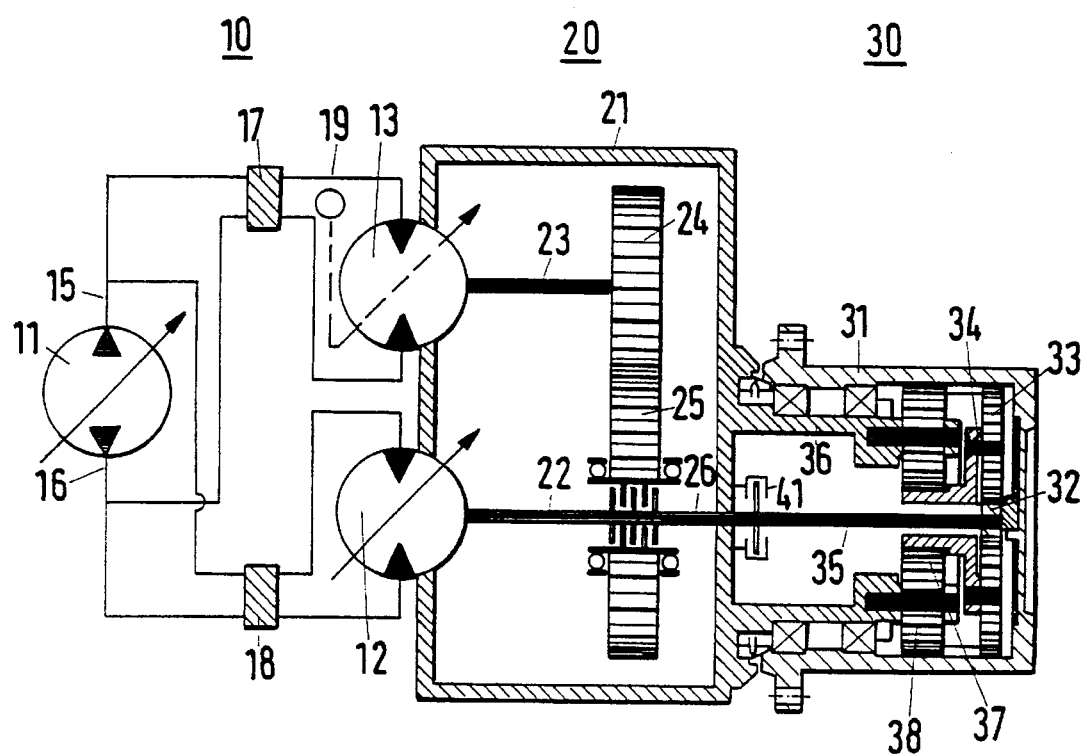

A hydraulic drive constructed in accordance with an illustrative embodiment of the present invention is illustrated in the Figure. The drive is compact in construction and comprises three subsystems, a hydraulic system 10, an intermediate gear system 20, and a power take-off system 30. As seen in the Figure, the hydraulic motors 12 and 13 of hydraulic system 10 are provided on one side of intermediate gear system 20 so that their respective drive shafts 22 and 23 are arranged parallel relative to one another.

Hydraulic system 10 further includes a variable displacement pump 11 in fluid communication with motors 12 and 13 and selectively operable to supply fluid in either a forward direction 15 or a reverse direction 16. To accommodate forward and reverse operation of hydraulic motors 12 and 13, four-port, two-position valves 17 and 18 are correspondingly interposed in the fluid circuit between pump 11 and motors 13 and 12, respectively. As will be readily ascertained by those skilled in the art, valves 17 and 18 are operable to short-circuit the motor circuit and close the pump circuit in the closed position, thereby shutting off the corresponding motor. When the hydraulic motors 12 and 13 are configured as null-stroke motors, a flow control valve 19 can also be utilized to shut off the flow in hydraulic circuits 15 and 16, as will be explained in more detail later.

With continuing reference to the Figure, it will be seen that the intermediate gear system 20 comprises a housing 21 through which are directed drive shafts 22 and 23 of motors 12 and 13, respectively. In order to provide a compact arrangement, hydraulic motors 12 and 13 are arranged in such a manner so that they project as far into housing 21 as possible.

As seen in the Figure, intermediate gear system 20 includes a spur gear 24 disposed within housing 21 and coupled to drive shaft 23 for rotation therewith. Also disposed within housing 21 is a gear member 25 having a centrally disposed clutch assembly 26 to permit selective engagement and rotation with drive shaft 22 and/or an output shaft 35 that is coaxially disposed relative to drive shaft 22. Spur gear 24 is dimensioned and arranged to mesh with gear member 25, and in accordance with the illustrative embodiment depicted in the Figure, the gear ratio between spur gear 24 and gear member 25 is from 1:1.5 to 1:4.5.

The positioning of clutch assembly 26 at the junction of drive shaft 22 and output shaft 35 is particularly advantageous in that it reduces the number of structural elements required while enabling the drive system, which includes drive shafts 22 and 23, to be reliably disconnected from the mechanically driven elements disposed within take-off system 30. When disengaging the clutch 26 and accordingly disconnecting one or both of the hydraulic motors from the power take-off system 30, the control part 19 serves to swivel to the angle alpha=0° and close the corresponding four-port/two-position hydraulic valve, or both of them in the case of simultaneous operation.

Accordingly, it will be readily appreciated that valves 17 and 18 may be utilized to simply and reliably shut off one or both motors without causing damage, i.e. without the risk of the motor continuing to turn without a load and exceeding the maximum allowable speed. As a result of this use of pre-charged control elements, it is possible to operate the drive in three speed ranges (i.e., by operation of the first hydraulic motor only, by operation of the second hydraulic motor only, or by simultaneous operation of both hydraulic motors).

The precise construction of power take-off system 30 will, of course, depend upon the specific installation. For example, power take-off system 30 may be configured as a winch, a tumbler, or the hub of a wheel. In any event, in accordance with the illustrative embodiment depicted in the Figure, power take-off system 30 includes a drum-shaped housing 31 into which output shaft 35 is directed. By using a drum-shaped configuration, it is possible to utilize housing 31 as the drum element of a winch or as the driving element of a land vehicle wheel.

Disposed within the interior of housing 31 and coupled to output shaft 35 for rotation therewith is a spur gear 32. In accordance with the illustrative embodiment depicted in the Figure, spur gear 32 is the sun gear of a two-stage planetary gear system. Essentially, sun gear 32 meshes with planetary gears 33 which are in turn connected via a stud 34 with a second sun gear 37 that encloses output shaft 35. Sun gear 37 meshes in turn with planetary gears 38 whose connection studs are supported by housing 21.

A mechanical brake assembly, which includes a frictional engaging member 41 coupled to output shaft 35 for rotation therewith and a caliper assembly adapted to engage member 41, is also provided. The construction and operation of such mechanical braking assemblies are well known and are not deemed to constitute a novel aspect of the present invention. For clarity, a detailed description and illustration of the same has therefore been omitted.

It should be understood that the preferred embodiments and examples described are for illustrative purposes only and are not to be construed as limiting the scope of the present invention which is properly delineated only in the appended claims.

What is claimed is:

1. A hydraulic drive system, comprising:

a variable displacement pump;

first and second hydraulic motors in fluid communication with said pump, wherein said first hydraulic motor is a variable speed motor and wherein each of said motors includes a drive shaft;

valve means, interconnecting said pump and said first and second hydraulic motors, respectively, for selectively shutting off flow of fluid therebetween and thereby preventing operation thereof;

an output shaft;

an intermediate gear unit interconnecting the drive shafts of said hydraulic motors to said output shaft, said intermediate gear unit including a first gear member coupled to the drive shaft of said second hydraulic motor, a second gear member, and a clutch assembly coupled to said second gear member and selectively engageable with said output shaft and the drive shaft of said first hydraulic motor; and a driven assembly including a drum shaped housing and a planetary gear system including a third gear member coupled to said output shaft for rotating said drum shaped housing.

2. The drive system according to claim 1, wherein said valve means comprises first and second four-port, two-position hydraulic valves and wherein said first and second hydraulic motors are variable flow, variable speed motors.

3. The drive system according to claim 1, wherein said valve means further includes flow control means for shutting off flow of fluid from the pump to thereby providing zero-stroke operation of said motors.

4. The drive system according to claim 2, wherein said intermediate gear unit is positioned within an intermediate housing and wherein the hydraulic motors are arranged on a side of said intermediate housing opposite of the driven assembly and partially project thereinto.

5. The drive system according to claim 1, wherein said intermediate gear unit is positioned within an intermediate housing, further including a brake associated with the output shaft and supported by an exterior surface of said intermediate housing.

6. The drive system according to claim 1, wherein said drum-shaped housing is a winch drum.

7. The drive system according to claim 1, wherein said drum-shaped housing drives a wheel of a land vehicle.

8. The drive system according to claim 1, wherein said intermediate gear unit is positioned within an intermediate housing and wherein the planetary gear system of said driven assembly includes first and second spur gears and an end stud projecting from a second exterior surface of the intermediate housing.

* * * * *